Figure 1:
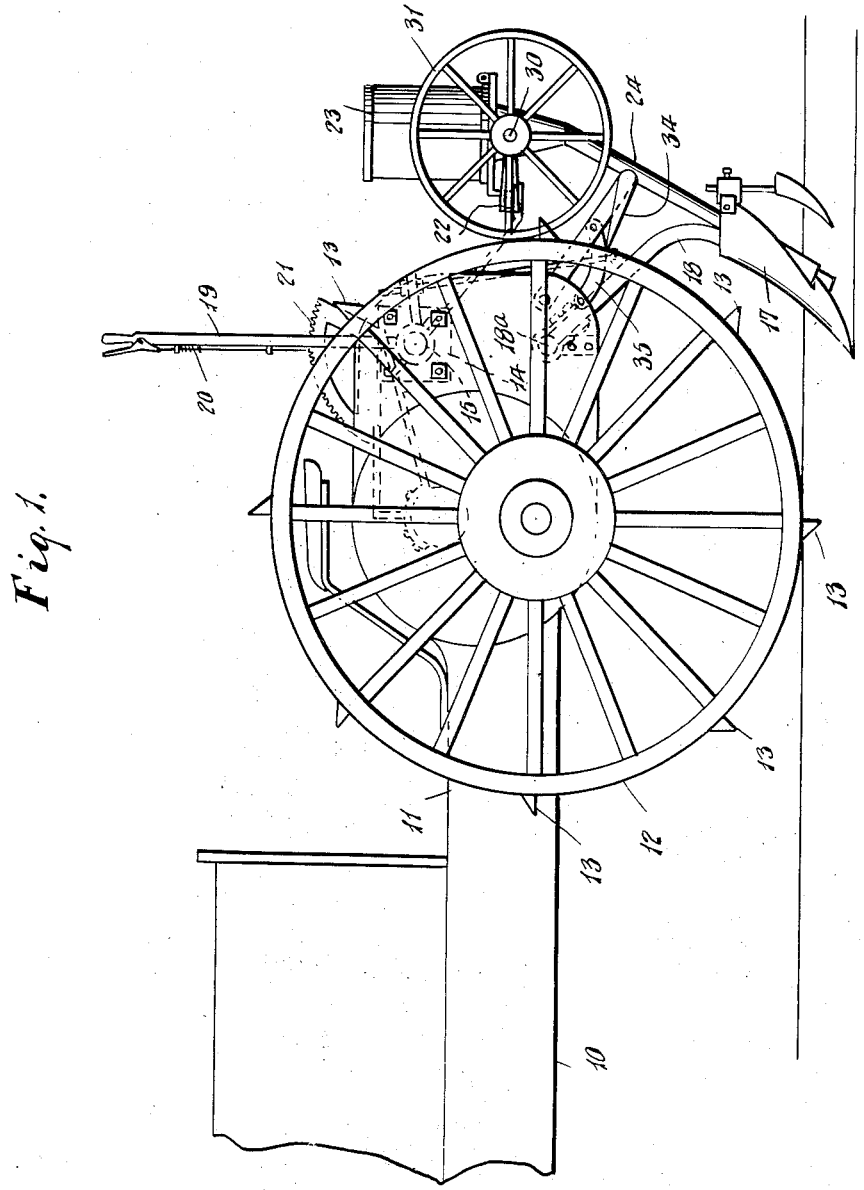

July 11, 1933.  E. E. BARRON ET AL  1,918,172
SEEDER ATTACHMENT FOR TRACTORS
Filed May 5, 1931  3 Sheets-Sheet 1

Inventor
E. E. Barron, S. R. Barron.

By L. F. Randolph Jr.

Attorney

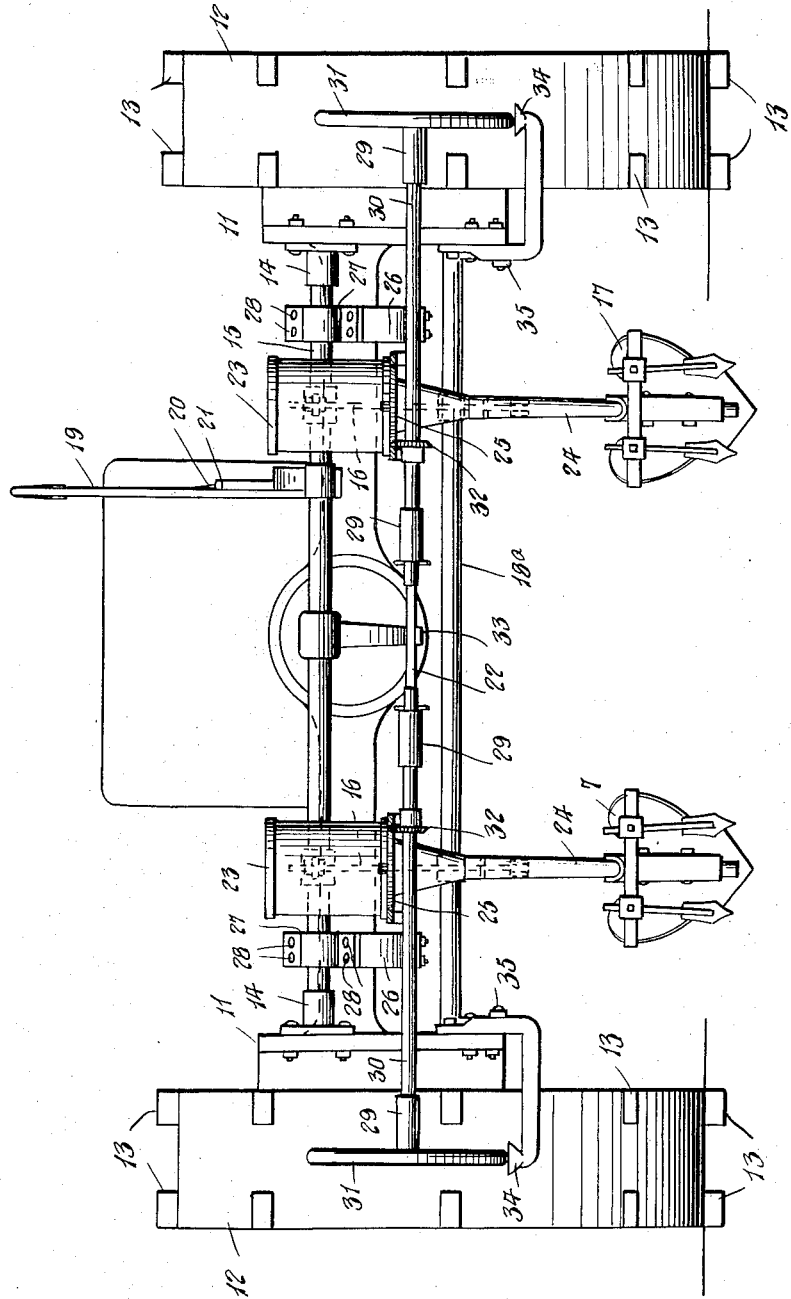

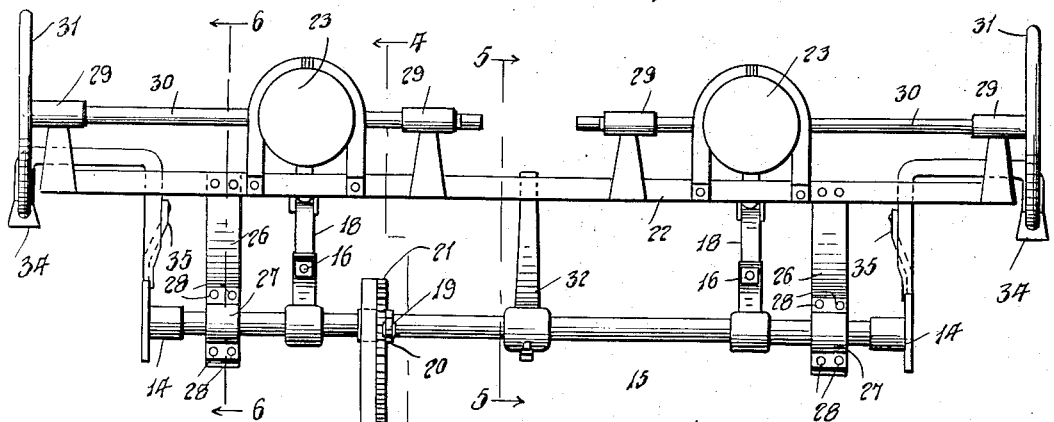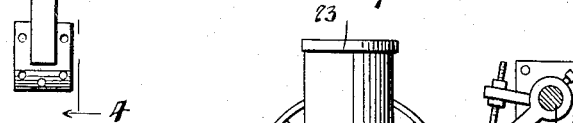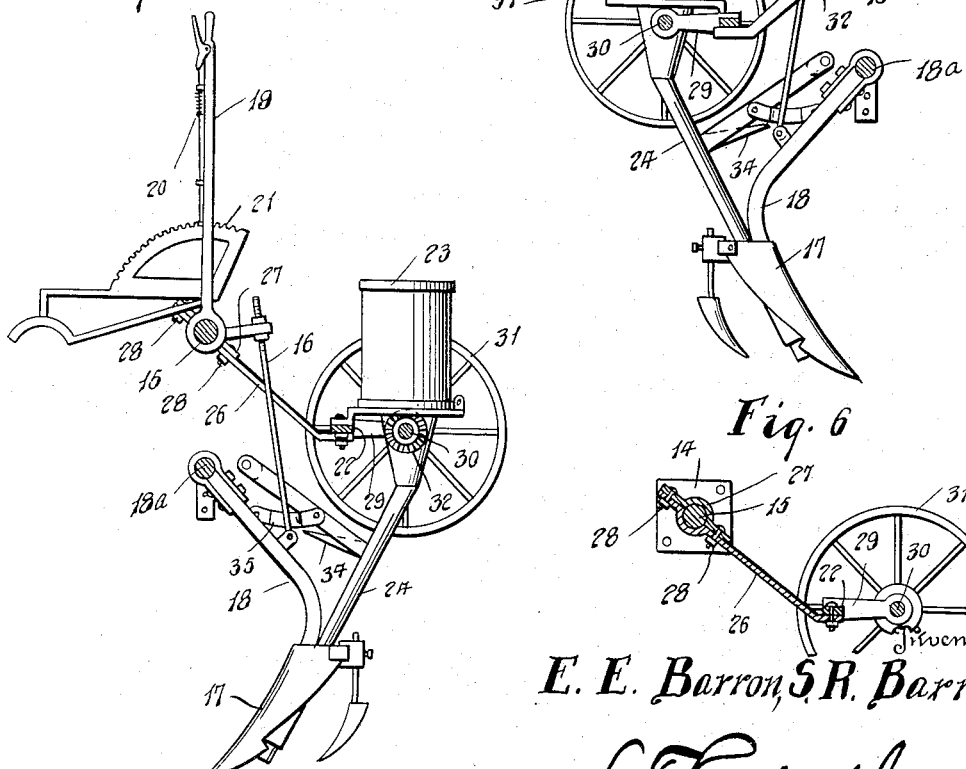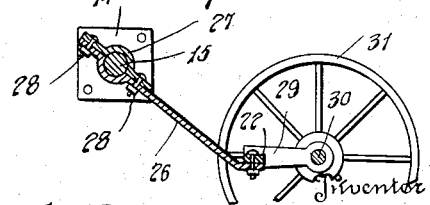

Patented July 11, 1933

1,918,172

UNITED STATES PATENT OFFICE

ERIE E. BARRON AND SPENCER R. BARRON, OF LAMESA, TEXAS

SEEDER ATTACHMENT FOR TRACTORS

Application filed May 5, 1931. Serial No. 535,134.

This invention relates to a planter attachment for farm tractors and it primarily aims to provide an exceedingly simple and compact construction which may be driven by friction from the rear ground wheels of the tractor.

Another object is to provide a novel structure wherein the planter is connected to the rock shaft which is used in tractors to vary the elevation of plows, the planter being driven by friction or contact of parts thereof with wheels of the tractor and being disengaged from such wheels through elevation or movement of the plows to an inoperative position.

The more specific objects and advantages will become apparent from a consideration of the description following taken in connection with accompanying drawings illustrating an operative embodiment.

In said drawings:—

Figure 1 is a view showing my attachment applied to a farm tractor, the latter being shown fragmentarily, Figure 2 is a rear elevation of the parts of Figure 1, Figure 3 is a plan view primarily showing our attachment, together with parts on the tractor coacting therewith, Figure 4 is a vertical sectional view taken on the line 4—4 of Figure 3, Figure 5 is a vertical sectional view taken on the line 5—5 of Figure 3, and Figure 6 is a vertical sectional view taken on the line 6—6 of Figure 3.

Referring specifically to the drawings, 10 designates a conventional farm tractor or the like having a suitable frame 11. The rear ground wheels are shown at 12 and each preferably has on its periphery a series of laterally spaced grousers or lugs 13. On the frame 11, sockets or bearings 14 journal the opposite ends of a rock shaft 15 which is operable, through linkage 16 to raise and lower conventional plows and associated parts 17, whose beams 18 are pivoted as at 18ª to the frame 11. Such shaft 15 is rocked through the medium of a lever 19 rigid therewith, and which lever carries a locking mechanism 20 adapted for locking engagement in adjusted position with a segment 21 suitably carried on the frame. It will be understood that the parts described are merely conventional and have been specifically referred to to render the attachment, construction, and operation of our improvements clear.

Our improvements use a bar or frame 22 which carries one or more seed boxes or hoppers 23 arranged to discharge into feed tubes 24 behind the plows 17, to which they may be fastened. The seed boxes or hoppers 23 and the discharge mechanism 25 thereof are conventional. Brackets 26 are secured to the frame 22 and have plates 27 bolted thereto at 28, pivotally connecting the frame on the rock shaft or bar 15.

Suitably journaled in bearings 29 on frame 22, are operating shafts 30 carrying friction wheels 31 at one end thereof which are adapted to frictionally engage the peripheries of the wheels 12 between the grousers 13, such frictional action being efficiently maintained due to the pivotal connection of the frame on the rock shaft 15. Each shaft 30 has a bevel gear or the like 32 thereon in driving relation to the seed-discharge mechanism 25.

It will thus be seen that the planting mechanism or attachment is driven solely by frictional contact of the wheels 31 with the wheels 12. Such rotation of wheels 31 rotates the shafts 30 which through the medium of the gear wheels 32 operates the seed discharge mechanism 25.

The rock shaft 15 has an arm 33 rigidly connected thereto and extending under the frame 22. As a result, upon operation of the lever 19 to lift the plows 17, such motion will also lift the frame 22 swinging it on the shaft 15 as an axis and accordingly raising the wheels 31 out of driving contact with the wheels 12. The planter mechanism may be locked in this elevated position as well as the plows, through the engagement of the locking device 20 with segment 21.

In order to insure the peripheries of the wheels 12 being relatively clean at the zone of engagement by the friction wheels 31, scraper members 34 are arranged to constantly scrape such peripheries, the same being for example, rigidly attached as by means of bolts 35 to a suitable portion of the frame 11.

Various changes may be resorted to provided they fall within the spirit and scope of the invention.

What is claimed is:—

1. In combination with an implement having ground wheels, and a rock shaft, means to operate and secure the rock shaft in different positions, a frame pivoted on said rock shaft, a planter mechanism carried by the frame, means to actuate the planter mechanism having a shaft, a driving wheel on the second mentioned shaft in contact with the periphery of one of the first mentioned wheels, and means whereby actuation of the rock shaft will move said driving wheel out of driving relation.

2. In combination with an implement having ground wheels, and a rock shaft, means to operate and secure the rock shaft in different positions, a frame pivoted on said rock shaft, a planter mechanism carried by the frame, means to actuate the planter mechanism having a shaft, a driving wheel on the second mentioned shaft in contact with the periphery of one of the first mentioned wheels, and means whereby actuation of the rock shaft will move said driving wheel out of driving relation the same consisting of an arm on the rock shaft extending below said frame.

3. In combination with an implement having traction wheels, a plow-operating rock shaft between the wheels and parallel with the axis thereof, means to operate and secure the rock shaft in different positions, means journaling the rock shaft on the implement, a frame having means pivotally mounting the same on the rock shaft, drive shafts, bearings on the frame in which the drive shafts are journaled, feeder mechanism carried by the frame, gearing to actuate the feeder mechanism from the drive shafts, friction wheels on said drive shafts adapted to engage the periphery of the ground wheels, and an arm on the rock shaft extending below said frame adapted for engagement with the frame to move the friction wheels out of contact with the ground wheels as the rock shaft is actuated to raise the plows.

4. In combination with an implement having ground wheels, and a rock shaft, means to operate and secure the rock shaft in different positions, a frame pivoted on the rock shaft, a planter mechanism carried by the frame, means to actuate the planter mechanism having a shaft, a driving wheel on the second mentioned shaft in contact with the periphery of one of the ground wheels, a scraper mechanism for cleaning the ground wheel in advance of the driving wheel, and means whereby actuation of the rock shaft will move the driving wheel out of driving relation with the ground wheel.

In testimony whereof we affix our signatures.

ERIE E. BARRON.
SPENCER R. BARRON.